United States Patent [19]

Chauvin

[11] 4,057,605

[45] Nov. 8, 1977

[54] MANUFACTURE OF LIGHT GRANULAR MATERIALS

[75] Inventor: Raymond Chauvin, Verneuil-en-Halatte, France

[73] Assignee: Charbonnages de France, Paris, France

[21] Appl. No.: 637,648

[22] Filed: Dec. 4, 1975

Related U.S. Application Data

[63] Continuation of Ser. No. 433,617, Jan. 15, 1974, abandoned.

[30] Foreign Application Priority Data

Jan. 19, 1973 Luxembourg ............................ 66860

[51] Int. Cl.$^2$ .................................................. B01J 2/04
[52] U.S. Cl. ........................................ 264/13; 264/42; 264/117
[58] Field of Search ................... 264/13, 7, 42, 43, 117

[56] References Cited

U.S. PATENT DOCUMENTS

| | | | |
|---|---|---|---|
| 3,118,658 | 1/1964 | Dennert | 264/43 |
| 3,150,989 | 9/1964 | Parsons | 264/13 |
| 3,259,171 | 7/1966 | Siemssen | 264/43 |
| 3,406,228 | 10/1968 | Hardy et al. | 264/13 |
| 3,880,968 | 4/1975 | Kaspar et al. | 264/DIG. 51 |

*Primary Examiner*—Robert F. White
*Assistant Examiner*—James R. Hall
*Attorney, Agent, or Firm*—Karl W. Flocks

[57] ABSTRACT

Light granular material is manufactured from silico-aluminous material by crushing and/or screening the silico-aluminous material to a fine powder which is mixed with water to form a slip which is divided into drops which are immediately introduced into a hot fluidised bed. The water evaporates rapidly and the drops are converted into expanded granules which are recovered and subjected to ceramic firing.

11 Claims, No Drawings

MANUFACTURE OF LIGHT GRANULAR MATERIALS

This is a continuation of application Ser. No. 433,617, filed Jan. 15, 1974, now abandoned.

BACKGROUND OF THE INVENTION

1. Field of the Invention

The present invention relates to a process for the manufacture of light granular materials from silico-aluminous substances such as shales, clay, ashes or certain industrial residues. These materials are suitable for use in building or in various other fields, such as the manufacture of light concretes, or thermal insulation.

2. Description of the Prior Art

Up to now the manufacture of artificial light granules has necessitated the preparation of a crude product in the form of nodules, rods, pellets or any other type of agglomerate in lump form of various sizes, the mechanical strength of which after drying had to be sufficient in order to avoid any appreciable subsequent dimensional breakdown during handling prior to firing. The lightening of the dry agglomerated product was obtained by expansion at a temperature at which the material was brought to melting point and at which the gases formed as a result of complex reactions inside the mineral material caused the swelling of the softened granule.

In the process of the prior art, the gases causing the expansion arise from oxidation/reduction and dissociation reactions inside the silico-aluminous material and possibly from the decomposition of porogenic agents added to the raw material. This evolution of gas must be produced at the moment when the material has a suitable plasticity so that the fine bubbles of gas can expand sufficiently without however escaping from the granule.

The fact that the evolution of the gases takes place simultaneously with a certain pyroplastic state of the material permitting the swelling, limits the number of silico-aluminous products which can be used to obtain lightened products. Of course, it is possible to correct the properties of the raw material by the addition of fluxing products (lime, dolomite, alkali salts, iron oxide) or porogenic products, but at the cost of complication of the processing installations used and an increase in the cost price.

On the other hand, the necessity of passing through a softened phase favours the sticking of the grains to one another or on to the walls of the treatment apparatus.

Finally, the nature of the process makes it necessary to employ raw materials which are poor in carbon, which sometimes means, for example in the case of coal shale, a prior "decarbonation" treatment.

SUMMARY

A main object of the invention is to avoid the above mentioned drawbacks, and to provide a process which is simpler to carry out than the processes of prior art.

In the process according to the invention silico-aluminous material is prepared in fine powder, and the fine powder is mixed with a quantity of water sufficient to make a slip which can be divided into drops. These drops are introduced into a fluidized bed, whose temperature is such that the water evaporates rapidly in the form of steam before each drop has lost all its plasticity, the drops being then converted into expanded granules which are recovered and undergo a ceramic firing treatment of known kind.

The raw materials which can be used in the process according to the invention comprise all the materials of a silico-aluminous nature or rich in silico-aluminous constituents, such as clay, coal shale or dirt coming from coal mining, the ashes of steam generating stations, demolition rubble, the solid residues of the incineration of municipal waste and most of the solid reject products of the mining and mineral industry.

The raw material, reduced if necessary by crushing and/or screening to a fine particle size, preferably less than 200 microns, is first of all mixed with a sufficient quantity of water to form a slip which can be converted into drops. The minimum quantity of water to be used is just enough to ensure drop formation, which depends on the raw material used and on the apparatus used for forming the drops. The maximum quantity of water to be used is dictated by economic considerations, since the water has to be evaporated during the subsequent process. In practice a proportion of water between 25% and 40% by weight of the slip obtained is used with advantage.

In the case of shale and clay, the mixture of raw material and water takes the form of a colloidal suspension. Ashes do not directly give a colloidal suspension with water and it is necessary to add to the mixture a binder and film-forming agent, such as bentonite or a fatty clay. This agent, which ensures the formation of a colloidal suspension, also plays the part of a plasticiser which retains water and is thus favorable for obtaining good expansion. Other raw materials such as the solid rejects of the mining or mineral industry, demolition rubble, and residues from the incineration of municipal waste, by virtue of their constitution behave in a manner which is intermediate between that of shale or clay and that of ashes. It is therefore necessary, according to their composition, to add to them a greater or lesser quantity of plasticisers, such as bentonites or fatty clays.

In any case it is possible to modify the rheological properties of the mixture obtained by adding to it not only plasticisers such as bentonites and clay, but also surface active agents of the anionic, cationic or neutral type and fluidifiers or deflocculants such as sodium tripolyphosphate and lignosulphonates or caustic soda.

It is also possible to add porogenic agents such as ammonium carbonate, alkali bicarbonates, urea or certain oxygenated compounds of sulphur so as to increase the formation of cavities inside the drops prior to their complete solidification so as to obtain products which have a particularly low apparent density.

It is also possible to add air entraining agents so as to create, during the mixing of the slip, fine bubbles of air which cause the formation of an additional porosity. As air entraining agents there are used in particular surface active agents such as sodium dodecylbenzene sulphonate.

The slip thus prepared is divided into drops which are introduced into a fluidized bed, for example a bed of fluidized sand, maintained at a temperature of between 200° C and 500° C, so that the water present in the slip is evaporated rapidly as steam. One can use both a fluidized passage or a vertical enclosure with fluidized bed. It has been found that under these conditions the drops of slip are converted into light weight, porous and expanded granules of a spheroidal shape and of sufficient solidity to withstand a subsequent ceramic firing treatment after extraction from the fluidized bed.

Instead of sand, the fluidized bed may sometimes advantageously consist of the product itself which it is desired to expand. Thus, when the raw material has to be subjected to crushing, the fraction lower than 200 microns, for example, will be taken out for preparing the slip, while a coarser fraction will be used as a constituent of the fluidized bed.

The temperature of the fluidized bed, which is between 200° C and 500° C is preferably of the order of 300° C to 400° C. The removal of the water vapor and of the gases liberated by the porogenic agent is quicker, the higher the temperature of the fluidized bed. At the lowest temperatures expanded granules are obtained which are fairly dense and contain small dimension cavities. At the highest temperatures, the granules, which contain large cavities, are very light in weight, and they then entrain much less of the particles of the fluidized bed adhering to their surface. It is therefore of interest to operate at elevated temperature, but when doing so it is necessary to control the gradual evolution of the gas so that the mechanical properties remain acceptable. In point of fact a poorly regulated gradual gas evolution may lead to the production of granules whose surface is holed, which increases the coefficient of water retention and may cause drawbacks in certain applications.

The light weight granules obtained are separated from the fluidized bed by the usual technique, and then they are subjected to a ceramic firing.

The ceramic firing is carried out in a known manner in any suitable apparatus, such as a rotary kiln, a fluidized bed, a mobile grid, or a tank furnace. Its purpose is to give the granules sufficient solidity for their subsequent use. The firing may be carried out in an oxidizing or reducing atmosphere. The nature of the atmosphere, as well as the temperatures and firing times are selected according to the nature of the base material and the desired qualities of the finished product. It has been found that, for coal shale, a temperature of 1050° C, in an oxidizing atmosphere, for a firing time of 5 to 6 minutes, produced well consolidated granules with low water retention coefficient. The same temperature in a reducing atmosphere leads to a vitrification of the external surface of the granules with the consequent improvement of their mechanical properties and also of the water retention coefficient.

The granules obtained according to the invention have a substantially spherical shape, having a diameter which may vary according to the physical properties of the slip and according to the dimension of the drops made, between 0.5 mm and 10 mm. Their bulk density may be within wide limits; of the order of 0.4 to 0.8 metric tons/m$^3$.

These granules may be used alone or mixed with other lightened or non-lightened materials. In particular they may be used for the manufacture of light concretes and of thermal insulation.

DESCRIPTION OF THE PREFERRED EMBODIMENTS

EXAMPLES 1 to 8

Coal shale was used, whose chemical composition was as follows:

| | |
|---|---|
| Loss on ignition | 11.5% |
| Analysis of the calcined material | |
| $SiO_2$ | 61.0% |
| $Al_2O_3$ | 21.7% |
| $Fe_2O_3$ | 7.9% |
| $TiO_2$ | 1.1% |
| $CaO + MgO$ | 2.7% |
| $Na_2O + K_2O$ | 4.5% |
| $SO_3$ | 0.6% |

This shale was crushed until 100% of the powder obtained had a particle size of less than 200 microns and 85% had a particle size of less than 100 microns. From this powder a slip was prepared by adding water and the additives in quantities shown in the table below:

| Composition (parts) by weight) | EXAMPLE | | | | | | | |
|---|---|---|---|---|---|---|---|---|
| | 1 | 2 | 3 | 4 | 5 | 6 | 7 | 8 |
| Shale | 100 | 100 | 100 | 100 | 100 | 100 | 100 | 100 |
| Water | 50 | 50 | 60 | 48.5 | 48.5 | 48.5 | 39 | 42.5 |
| Bentonite | 0.8 | 1 | 2.5 | 1.5 | 1.5 | 1.5 | — | — |
| Sodium Lignosulphonate | — | — | — | — | — | — | 1.9 | — |
| Sodium tripolyphosphate | — | — | — | — | — | — | — | 2.5 |
| Sodium dodecylbenzene sulphonate | — | 0.5 | — | 0.1 | — | 1.2 | | |
| Caustic soda | — | — | — | 0.1 | 0.1 | — | — | — |
| Sodium bicarbonate | — | 0.5 | 2 | — | 0.5 | — | 1.25 | 2 |

The slip so obtained is fed from a tank and flows as far as a nozzle bar having nozzles, the diameter of which is regulated according to the desired particle size of the finished product and which may suitably be 1 mm. The nozzle bar is given a vibrating movement along the axis of the jets, which has the advantage of ensuring an easy flow of the fluidized slip as a result of the vibrations and causes the periodic rupture of the jets leaving the nozzles. The drops thus formed fall into a bed of fluidized sand maintained at 350° C to 400° C. A continuous feed of sand to the fluidized bed causes a continuous overflow of the layer and an entrainment of the expanded and dried granules which are separated from the sand by screening.

The ceramic firing of the granules is carried out in a rotary kiln with an axis which is slightly inclined to the horizontal. The granules are fed to the upper part of the kiln and flow to the lower part by the combined effect of the rotation of the kiln and gravity. The firing is carried out at 1050° C in an atmosphere of air for 5 to 6 minutes. Granules of good mechanical quality are obtained having an average diameter of about 3 mm to 4 mm and a bulk density in metric tons/m$^3$ of 0.6 for Example 1 and from 0.4 to 0.45 for Examples 2 to 8.

EXAMPLE 9

The operation was carried out as in Example 3, but using, instead of a fluidized bed of sand, a fluidized bed of calibrated coal shale having a particle size of between 200 and 500 microns.

The same result was obtained as in Example 3.

EXAMPLE 10

The operation was carried out as in Example 8, but using a fluidized bed of sand maintained at a temperature of 450° C to 500° C. Granules were obtained having a bulk density of 0.3 metric tons/m³.

EXAMPLES 11 to 13

Fly ash from a steam generating station was used having a particle size of less than 100 microns and whose chemical composition was as follows:

| loss on ignition | 1% |
| --- | --- |
| Analysis of the calcined material | |
| $SiO_2$ | 52.4% |
| $Al_2O_3$ | 29.0% |
| $Fe_2O_3$ | 8.2% |
| CaO + MgO | 4.0% |
| $TiO_2$ | 1.0% |
| $Na_2O + K_2O$ | 5.4% |

From this ash a slip was prepared by adding water and additives in the quantities shown in the table below:

| Composition (parts by weight) | Example 11 | Example 12 | Example 13 |
| --- | --- | --- | --- |
| Fly ash | 100 | 100 | 100 |
| 10% aqueous gel of bentonite | 75 | 75 | 75 |
| Sodium tripolyphosphate | — | 5 | — |
| Sodium bicarbonate | 5 | 5 | 5 |
| Urea | — | — | 5 |

The slip obtained was treated as in Examples 1 to 8. Granules of good mechanical quality were obtained, having a mean diameter of about 3 mm to 4 mm and a bulk density of 0.5 to 0.6 metric tons/m³.

I claim:

1. A method of manufacturing porous granular material useful as lightweight aggregate for concrete, and obtained from silico-aluminous material, comprising:
   a. crushing the silico-aluminous material to a powder having a particle size of less than about 200 microns,
   b. mixing said powder with water to form a slip which can be divided into droplets, said slip containing 25-40% by weight of water,
   c. forming said slip into droplets which fall into a fluidized bed of solid particles, said bed being maintained at a temperature of 200°-500° C,
   d. evaporating the water from said droplets in said bed to convert said droplets to expanded granules,
   e. recovering said expanded granules, and
   f. subjecting said expanded granules to ceramic firing.

2. A method according to claim 1, wherein the temperature of the fluidized bed is between 300° C and 400° C.

3. A method according to claim 1, wherein said solid particles of the fluidized bed are in the form of grains and are of the same material as that which is used for forming the slip.

4. A method according to claim 1, comprising adding a surface active agent to the slip.

5. A method according to claim 1, comprising adding a plasticiser such as bentonite to the slip.

6. A method according to claim 1, comprising adding a porogenic agent to the slip.

7. A method according to claim 1, comprising adding to the slip fluidifier selected from the group consisting of sodium tripolyphosphate, lignosulphonates, and caustic soda.

8. A method according to claim 1, wherein said silico-aluminous material is selected from the group consisting of shale and clay.

9. A method according to claim 1, wherein said silico-aluminous material comprises ashes, and wherein a binder and film-forming agent is added to the ashes no later than during formation of the slip.

10. A method according to claim 1, wherein the solid particles of the fluidized bed consists of sand.

11. A method in accordance with claim 1, wherein said silico-aluminous material is selected from the group consisting of coal shale and fly ash, and said ceramic firing is carried out at about 1050° C.

* * * * *